(12) United States Patent
Miki (10) Patent No.: US 9,043,617 B2
(45) Date of Patent: May 26, 2015

(54) DEVICE INCORPORATING DATA COMMUNICATION FUNCTION

(75) Inventor: Tomohiro Miki, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 311 days.

(21) Appl. No.: 12/865,086

(22) PCT Filed: Jan. 28, 2009

(86) PCT No.: PCT/JP2009/051369
§ 371 (c)(1),
(2), (4) Date: Jul. 28, 2010

(87) PCT Pub. No.: WO2009/096430
PCT Pub. Date: Aug. 6, 2009

(65) Prior Publication Data
US 2010/0325448 A1    Dec. 23, 2010

(30) Foreign Application Priority Data
Jan. 30, 2008  (JP) .................................. 2008-019354

(51) Int. Cl.
*G06F 1/26* (2006.01)
*G06F 1/32* (2006.01)

(52) U.S. Cl.
CPC .............. *G06F 1/266* (2013.01); *G06F 1/3203* (2013.01)

(58) Field of Classification Search
CPC ................................ G06F 1/3203; G06F 1/266
USPC ........................... 700/295–298; 713/300–340
See application file for complete search history.

(56) References Cited

U.S. PATENT DOCUMENTS

| | | | | |
|---|---|---|---|---|
| 6,128,743 A * | 10/2000 | Rothenbaum | ................. | 713/300 |
| 6,530,026 B1 * | 3/2003 | Bard | .............................. | 713/320 |
| 6,580,460 B1 * | 6/2003 | Takahashi et al. | ............. | 348/372 |
| 6,735,671 B1 * | 5/2004 | Kida | .............................. | 711/111 |
| 6,774,604 B2 * | 8/2004 | Matsuda et al. | ............... | 320/110 |
| 6,963,933 B2 * | 11/2005 | Saito et al. | ......................... | 710/1 |
| 7,010,703 B1 * | 3/2006 | Kobayashi | .................... | 713/300 |
| 7,024,567 B2 * | 4/2006 | Kim et al. | ...................... | 713/300 |
| 7,127,621 B2 * | 10/2006 | Wierzbicki et al. | ........... | 713/300 |
| 7,131,013 B2 * | 10/2006 | Sasakura et al. | .............. | 713/300 |

(Continued)

FOREIGN PATENT DOCUMENTS

| | | | |
|---|---|---|---|
| JP | H10-171562 A | 6/1998 | |
| JP | H10-301673 A | 11/1998 | |

(Continued)

OTHER PUBLICATIONS

International Search Report issued by the Japanese Patent Office for Application No. PCT/JP2009/051369 dated Mar. 10, 2009.

*Primary Examiner* — Nimesh G Patel
(74) *Attorney, Agent, or Firm* — Procopio, Cory, Hargreaves & Savitch LLP (57) ABSTRACT

A device incorporating a data communication function 15 having a power supply circuit 38 of a dispersed power supply system is provided with a terminal 51-2 for receiving power supply from another device 14 which initiates data communication and a drive circuit 53-2 for performing the data communication with the another device 14, wherein when the terminal 51-2 is supplied with power, the power supplied to the terminal 51-2 is supplied to the drive circuit 53-2 in an off state of the power supply circuit 38. It thereby reduces self-power-loss and ensures reliability of performance.

4 Claims, 10 Drawing Sheets

(56) References Cited

U.S. PATENT DOCUMENTS

| | | | |
|---|---|---|---|
| 7,293,187 B2* | 11/2007 | Ono | 713/324 |
| 7,310,697 B2* | 12/2007 | Pandit et al. | 710/313 |
| 7,363,520 B1* | 4/2008 | Maier et al. | 713/300 |
| 7,420,296 B2* | 9/2008 | Shintomi | 307/80 |
| 7,423,354 B2* | 9/2008 | Suzuki et al. | 307/28 |
| 7,424,569 B2* | 9/2008 | Matsuda | 710/316 |
| 7,424,632 B2* | 9/2008 | Powers et al. | 713/323 |
| 7,498,521 B2* | 3/2009 | Forbes et al. | 174/255 |
| 7,627,288 B2* | 12/2009 | Iida | 455/41.1 |
| 7,729,941 B2* | 6/2010 | Zampini et al. | 705/14.4 |
| 7,757,104 B2* | 7/2010 | Kiyozaki | 713/300 |
| 8,093,749 B1* | 1/2012 | Lew et al. | 307/29 |
| 8,112,641 B2* | 2/2012 | Schindler | 713/300 |
| 2003/0083840 A1* | 5/2003 | Corr | 702/117 |
| 2003/0126482 A1* | 7/2003 | Cruz | 713/300 |
| 2006/0045112 A1* | 3/2006 | Laiho | 370/419 |
| 2006/0202713 A1* | 9/2006 | Shumarayev | 326/38 |
| 2007/0223161 A1* | 9/2007 | Kiyozaki | 361/90 |
| 2008/0162955 A1* | 7/2008 | Shimizu | 713/300 |
| 2008/0269953 A1* | 10/2008 | Steels et al. | 700/295 |

FOREIGN PATENT DOCUMENTS

| | | |
|---|---|---|
| JP | 2002-095181 A | 3/2002 |
| JP | 2004-094495 A | 3/2004 |

* cited by examiner

| SEQUENCE | OFF | INTERNAL ACCESS | EXTERNAL ACCESS | INTERNAL ACCESS | SLEEP | EXTERNAL ACCESS | INTERNAL ACCESS |
|---|---|---|---|---|---|---|---|
| SYSTEM MODE | OFF | ACTIVE | | | SLEEP | ACTIVE | |
| I/F POWER SUPPLY ON INTERVALS OF MULTIPLE SUPPLY DEVICE | OFF | ON | | | OFF | ON | |
| I/F POWER SUPPLY ON INTERVALS OF DEVICE ACCORDING TO PRESENT INVENTION | OFF | ON | OFF | ON | OFF | ON | OFF |

DEVICE INCORPORATING DATA COMMUNICATION FUNCTION

CROSS REFERENCE TO RELATED APPLICATION

This application claims priority to and the benefit of Japanese Patent Application No. 2008-19354 (filed on Jan. 30, 2008), the entire content of which is incorporated herein by reference.

TECHNICAL FIELD

The present invention relates to a device incorporating data communication function and having a power supply circuit of a dispersed power supply system.

BACKGROUND ART

A mobile terminal such as a cellular phone, for example, is designed using a plurality of system devices. Many of such system devices included in the mobile terminal incorporate a data communication function and require a plurality of different voltages. As such, the mobile terminal uses a multiple power supply device which has a regulator and a converter for generating various voltages necessary for the plurality of system devices in one package, and supplies the voltage necessary for each system device from the multiple power supply device.

Figure 10:
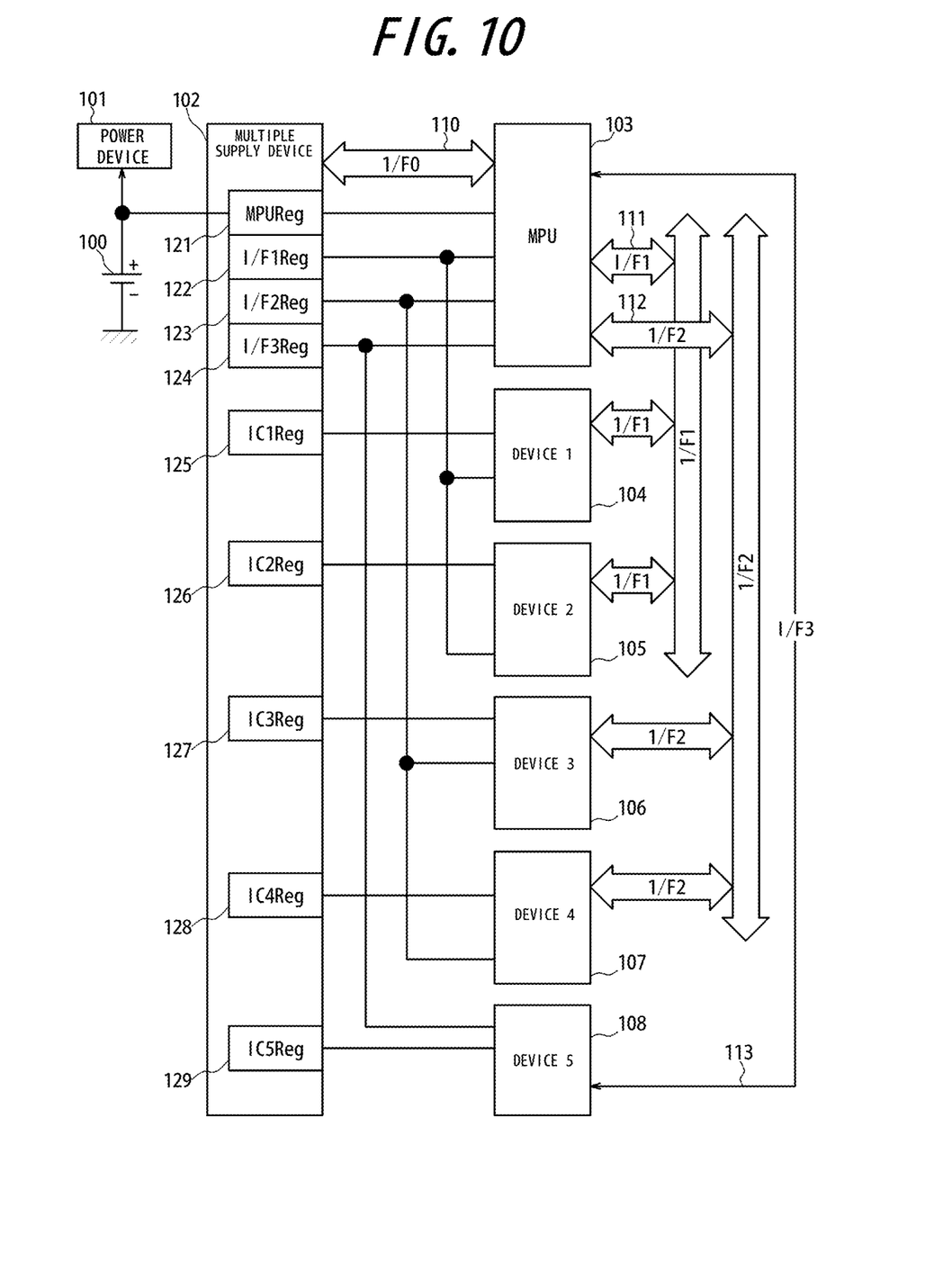
FIG. 10 is a block diagram illustrating a schematic configuration of a mobile terminal using the conventional multiple power supply device.

FIG. 10 is a block diagram illustrating a schematic constitution of the mobile terminal using a conventional multiple power supply device. This mobile terminal is provided with a battery 100, a power device 101 such as a power amplifier, a multiple power supply device 102, and an MPU (microprocessor unit) 103 and a first device (device 1) 104 to a fifth device (device 5) 108 as the plurality of system devices. The MPU 103, the first device 104 and the second device 105 are interconnected via an interface (I/F1) 111 to perform data communication. The MPU 103, the third device 106 and the fourth device 107 are interconnected via an interface (I/F2) 112 to perform data communication. The MPU 103 and the fifth device 108 are interconnected via an interface (I/F3) 113 to perform data communication.

In the mobile terminal shown in FIG. 10, a battery voltage of the battery 100 is directly supplied to the power device 101, whereas the battery voltage of the battery 100 is dropped or raised to a predetermined voltage by the multiple power supply device 102 before supplied to the MPU 103 and the first device 104 to the fifth device 108.

Therefore, in order to supply power to respective system devices and interfaces, the multiple power supply device 102 is provided with a power supply circuit (MPUReg) 121 for an MPU core of the MPU 103, a power supply circuit (I/F1Reg) 122 for the interface 111, a power supply circuit (I/F2Reg) 123 for the interface 112, a power supply circuit (I/F3Reg) 124 for the interface 113, a power supply circuit (IC1Reg) 125 for an IC core of the first device 104, a power supply circuit (IC2Reg) 126 for an IC core of the second device 105, a power supply circuit (IC3Reg) 127 for an IC core of the third device 106, a power supply circuit (IC4Reg) 128 for an IC core of the fourth device 107, and a power supply circuit (IC5Reg) 129 for an IC core of the fifth device 108. The multiple power supply device 102 is controlled by the MPU 103 via an interface (I/F0) 110.

The multiple power supply device shown in FIG. 10 is used not only for the mobile terminal but also for other electronic devices. The multiple power supply device is used for the electronic device because it can reduce a mounting area and therefore contribute to downsizing of the device by incorporating power supply circuits necessary to generate power for respective system devices and a power supply circuit having a regulator and a convertor common to the system devices within a single package.

In addition, when it is used for a small device such as the mobile terminal in particular, a substrate to be used can be designed to be small enough and a power supply line from the multiple power supply device to each system device can be short. Since the line impedance may thereby be reduced, it is possible to limit the voltage drop within an allowable range relatively easily.

In a case where the voltage drop cannot fall within the allowable range, a countermeasure which has been taken is, in case of a low voltage power supply, to detect a voltage for feedback from an input power supply terminal of the system device and, by using the voltage for feedback, to control a voltage at a corresponding output terminal of the multiple power supply device to be increased such that the voltage at the input power supply terminal of the system device is at a predetermined level.

However, in recent small devices, system devices which are miniaturized and perform at a high speed as well as being capable of performing large current at low voltage are used. When such a system device is used, since the voltage drop has influence even if the power supply line is short because of large current at low voltage, and a difference between the maximum operation power and the minimum operation power is large because of low power operation, it is not possible to follow the voltage drop by output setting for increasing the voltage. It may also not be able to follow to a transient response because of the high speed when output voltage is controlled by detecting a feedback voltage.

There may be a method to reduce the voltage drop by designing the power supply line (pattern) to be thick to minimize the line impedance. However, the thick pattern increases the size of substrate, thereby preventing downsizing.

In addition, the multiple power supply system which supplies power using the multiple power supply device stated above needs to redesign the power supply if the system is expanded exceeding a limit for power designing because of addition of functions to the device.

On the other hand, there is known a dispersed power supply system (Point-of-Load) other than the multiple supply system described above as the power supply system for the system devices. The system arranges a power supply circuit having a regulator and a convertor close to each system device and forms shortest connection between the power supply circuit and a corresponding system device to supply power.

Since the power supply circuit is connected to each system device by the shortest connection in the dispersed power supply system, it may not cause a problem such as the voltage drop and may easily allow the device to incorporate additional functions by changing the battery capacity, for example. However, in the dispersed power supply system the power supply circuits are arranged dispersedly corresponding to the system devices, resulting in increase of the number of components and thus increase of the mounting dimension. For this reason, the dispersed power supply system has been hardly used for small devices such as the mobile terminal.

However, there is recently suggested a hybrid device, as a device for the dispersed power supply system, which is a hybrid IC mounting power supply circuits individually in a package size of a conventional device or smaller. Accordingly, such hybrid device of the dispersed power supply system can solve both issues of downsizing and low voltage performance.

Nonetheless, in the dispersed power supply system, as shown in FIG. 10 for example, the voltage of the interface 111 which interconnects the MPU 103, the first device 104 and the second device 105 for data communication is generated at each device of the MPU 103, the first device 104 and the second device 105. Therefore, in comparison to the multiple power supply system which supplies power by generating the voltage of the interface 111 with a single power supply circuit (I/F1Reg) 122 commonly provided to the multiple power supply device 102, power supply circuits are overlapped and, the more overlapped they are, the more self-power-loss is generated at voltage conversion.

In addition, when the voltage for the interface is generated at each device connected via the interface, it is difficult to generate the same voltage, because of difference in individual power supply circuits. Therefore, it is concerned that some interfaces would not operate because of voltage difference between the devices and that malfunction may be caused because of detecting a false value, reducing reliability of performance.

As a power supply circuit which reduces self-power-loss, there is known a power supply circuit to be turned on/off based on an output voltage of a main battery (for example, see Patent Document 1).

However, the power supply circuit disclosed in Patent Document 1, if the output voltage of the main battery is equal to or higher than a predetermined value when a system is off, performs backup of a memory device by turning the power supply circuit off and directly supplying the output voltage of the main battery to the memory device of the system. While the system is on by external power supply (from another power supply circuit), the power supply circuit is never turned off. Therefore, it cannot reduce self-power-loss.

Patent Document 1: Japanese Patent Application Laid-Open No. 10-301673

DISCLOSURE OF THE INVENTION

Problems to be Solved by the Invention

It is an object of the present invention to provide a device incorporating a data communication function capable of reducing self-power-loss and ensuring reliability of performance.

SUMMARY OF THE INVENTION

In order to achieve the above object, a device incorporating a data communication function and having a power supply circuit of a dispersed power supply system according to a first aspect of the present invention, includes:

a terminal for receiving power supply from another device which initiates data communication; and a drive circuit for performing data communication with the another device, wherein if the power is supplied to the terminal, the power supplied to the terminal is supplied to the drive circuit in an off state of the power supply circuit.

A second aspect of the present invention is that the device incorporating the data communication function according to the first aspect includes:

a comparator for comparing voltage applied to the terminal and a standard voltage; and a reverse current preventing circuit for preventing reverse current from flowing to the power supply circuit, wherein if the comparator detects that the voltage applied to the terminal is lower than the standard voltage, the power supply circuit is turned on such that power is supplied to the drive circuit from the power supply circuit via the reverse current preventing circuit, and wherein if the comparator detects that the voltage applied to the terminal is equal or higher than the standard voltage while the power is supplied to the terminal, the power supply circuit is turned off such that the power being supplied to the terminal is supplied to the drive circuit.

A third aspect of the present invention is that the device incorporating the data communication function according to the first aspect includes:

a comparator for comparing voltage applied to the terminal and a standard voltage; and a reverse current preventing circuit for preventing reverse current from flowing to the power supply circuit, wherein if the comparator detects that the voltage applied to the terminal is lower than the standard voltage, the power supply circuit is turned on such that power is supplied to the drive circuit from the power supply circuit via the reverse current preventing circuit, and wherein if the comparator detects that the voltage applied to the terminal is reduced while the power is supplied to the terminal, the power is supplied to the drive circuit from the power supply circuit without the reverse current preventing circuit.

Moreover, in order to achieve the above object, a device incorporating a data communication function and having a power supply circuit of a dispersed power supply system according to a fourth aspect of the present invention, includes:

a drive circuit for performing data communication with another device;

a terminal for supplying power to the another device or for receiving power supply from the another device;

a comparator for comparing voltage applied to the terminal and a standard voltage; and a reverse current preventing circuit for preventing reverse current from flowing to the power supply circuit, wherein in order to initiate data communication the power supply circuit is turned on and power is supplied from the power supply circuit to the drive circuit as well as to the terminal, and wherein if the comparator detects that the voltage applied to the terminal is equal to or higher than the standard voltage while the power is supplied to the terminal, power is supplied to the drive circuit and the terminal from the power supply circuit via the reverse current preventing circuit, and then, if the comparator detects that the voltage applied to the terminal is equal to or higher than the standard voltage in a state where power supply from the power supply circuit is blocked, the power supply circuit is turned off and the power supplied to the terminal is supplied to the drive circuit.

EFFECT OF THE INVENTION

The device incorporating the data communication function according to the present invention, when receiving power supply from another device which initiates the data communication, turns off the power supply circuit of itself and drives the drive circuit by using power supplied from the another device. It is thus possible to reduce self-power-loss. Moreover, the device incorporating the data communication function according to the present invention, when receiving power supply with a voltage equal to or higher than a standard voltage from a reception-side device of the data communication, turns off the power supply circuit of itself and drives the drive circuit by using power supplied from the reception-side device. Thereby, it is possible to reduce self-power-loss. Furthermore, no voltage difference is generated in relation to the counterpart device of the communication since the power supply circuit of itself is turned off. Therefore, the data communication is performed without fail and reliability of performance is ensured.

REFERENCE SIGNS LIST 10 battery
11 power device
13 MPU
14-18 device incorporating data communication function
21, 22, 23 interface
31-44 power supply circuit
45, 46 interface unit
51-1, 51-2 power terminal
52-1, 52-2 data terminal
53-1, 53-2 drive circuit
54-1, 54-2 control unit
55-1, 55-2 switch
56-1, 56-2 reverse current preventing circuit
57-1, 57-2 switch
58-1, 58-2 comparator
61-1, 61-2 connection point
62-1, 62-2 switch

DESCRIPTION OF EMBODIMENTS

Preferred embodiments of the present invention will be described as follows, with reference to the accompanying drawings.

First Embodiment

Figure 1:
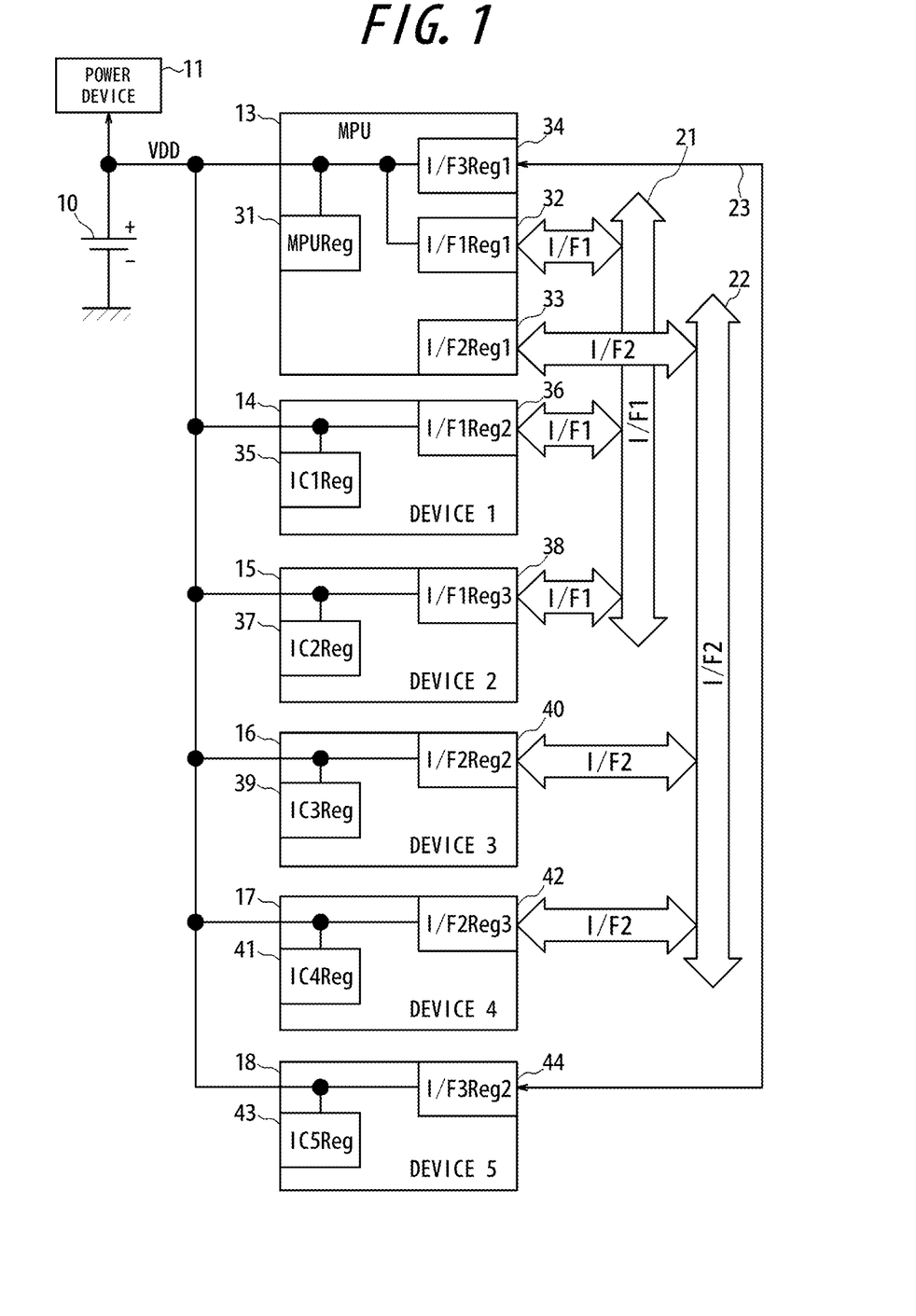
FIG. 1 is a block diagram illustrating an exemplified schematic configuration of a mobile terminal using a device incorporating a data communication function according to a first embodiment of the present invention.

FIG. 1 is a block diagram illustrating an exemplified schematic configuration of a mobile terminal using a device incorporating a data communication function according to a first embodiment of the present invention. The mobile terminal is provided with a battery 10, a power device 11 such as a power amplifier, an MPU 13, and a first device (device 1) 14 to a fifth device (device 5) 18. The power device 11 is directly driven by the battery voltage VDD of the battery 10.

Each of the MPU 13 and the first device 14 to the fifth device 18 is comprised of the device incorporating the data communication function according to the first embodiment of the present invention. The device means a machine, an apparatus, an electronic component and the likes having a particular function and includes also a module to achieve a particular function by combining components. The MPU 13, the first device 14 and the second device 15 are interconnected via an interface (I/F1) 21 to perform data communication. The MPU 13, the third device 16 and the fourth device 17 are interconnected via an interface (I/F2) 22 to perform data communication. The MPU 13 and the fifth device 18 are interconnected via an interface (I/F3) 23 to perform data communication.

Therefore, the MPU 13 has a power supply circuit (MPUReg) 31 for an MPU core, a power supply circuit (I/F1Reg1) 32 for the interface 21, a power supply circuit (I/F2Reg1) 33 for the interface 22, and a power supply circuit (I/F3Reg1) 34 for the interface 23 which are mounted thereon, and connects them to the battery 10.

The first device 14 has a power supply circuit (IC1Reg) 35 for an IC core and a power supply circuit (I/F1Reg2) 36 for the interface 21, which are mounted thereon, and connects each of them to the battery 10. Likewise, the second device 15 has a power supply circuit (IC2Reg) 37 for the IC core and a power supply circuit (I/F1Reg3) 38 for the interface 21, which are mounted thereon, and connects them to the battery 10.

The third device 16 has a power supply circuit (IC3Reg) 39 for the IC core and a power supply circuit (I/F2Reg2) 40 for the interface 22, which are mounted thereon, and connects them to the battery 10. Likewise, the fourth device 17 has a power supply circuit (IC4Reg) 41 for the IC core and a power supply circuit (I/F2Reg3) 42 for the interface 22, which are mounted thereon, and connects them to the battery 10.

In addition, the fifth device 18 has a power supply circuit (IC5Reg) 43 for the IC core and a power supply circuit (I/F3Reg2) 44 for the interface 23, which are mounted thereon, and connects them to the battery 10. It is to be noted that only the power supply circuits mounted on the MPU 13 and the first device 14 to the fifth device 18 are shown in FIG. 1 and a configuration of interface units corresponding to the power supply circuits for respective interfaces are not shown.

Figure 2:
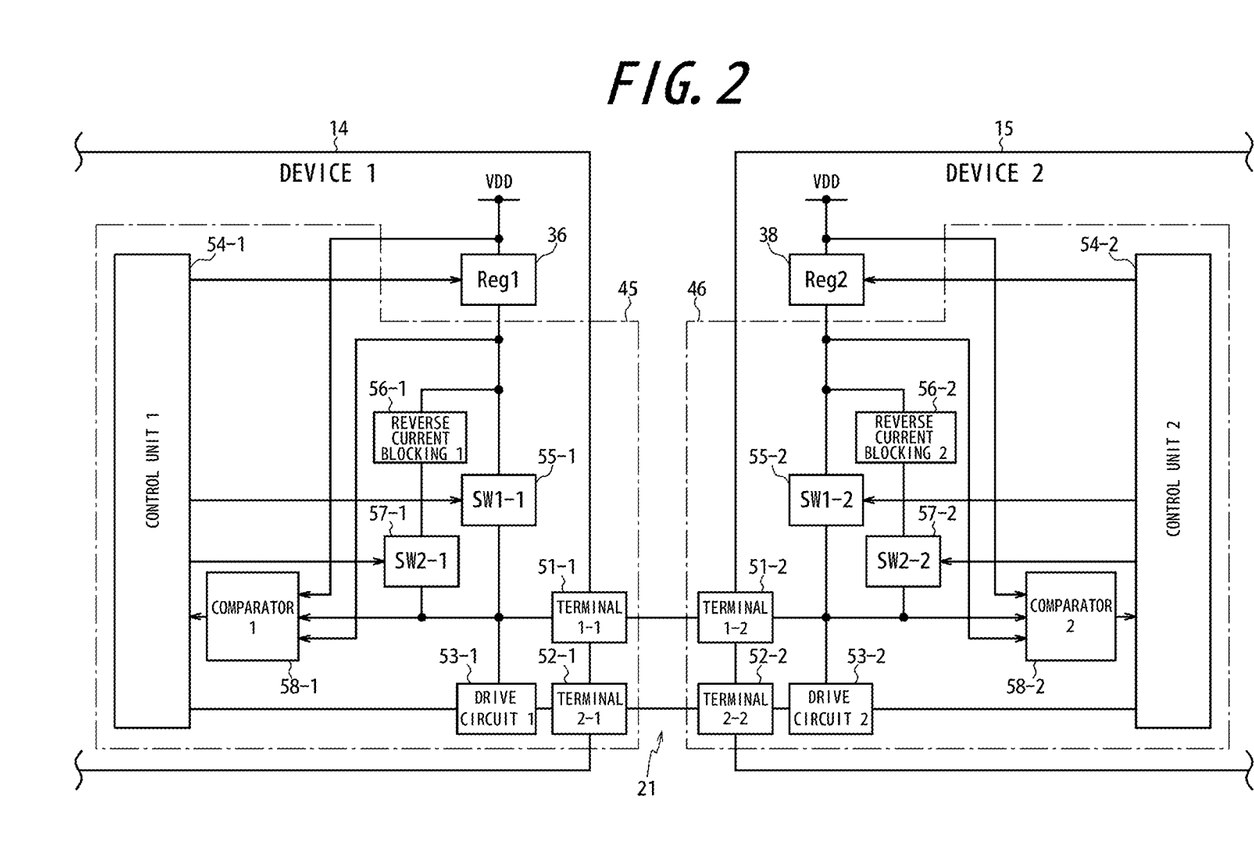
FIG. 2 is a block diagram illustrating a configuration of a main section of an interface unit of the device incorporating the data communication function shown in FIG. 1.

FIG. 2 is a block diagram illustrating a configuration of a main section of the interface unit of the device incorporating the data communication function according to the first embodiment of the present invention shown in FIG. 1. Configurations of the interface unit 45 of the first device 14 and the interface unit 46 of the second device 15, which are interconnected via the interface 21, are exemplified in FIG. 2. Other devices have the same configuration of the interface unit for each interface.

In the device incorporating the data communication function according to the present embodiment, an initiator device of the data communication supplies power for an interface to a reception-side device of the data communication. Thereby, the reception-side device turns off its own power supply circuit for the interface and enables the data communication.

The interface unit 45 of the first device 14 is provided with a power terminal 51-1 for supplying power to another device or receiving power supply from another device, a data terminal 52-1 for sending and receiving data, a drive circuit 53-1 for performing data communication via the data terminal 52-1, a control unit 54-1 for controlling the drive circuit 53-1, a switch 55-1, a reverse current preventing circuit 56-1 comprising a diode and the likes, and a switch 57-1. The first device 14 is configured such that the power supply circuit 36 for the interface 21 is capable of supplying power to the power terminal 51-1 and the drive circuit 53-1 via the switch 55-1 and also supplying power to the power terminal 51-1 and the drive circuit 53-1 via the reverse current preventing circuit 56-1 and the switch 57-1.

The interface unit 45 is provided with a comparator 58-1 for comparing the battery voltage VDD, which is an input voltage of the power supply circuit 36, an output voltage of the power supply circuit 36, and a voltage applied to the power terminal 51-1. The comparator 58-1 determines whether there is an applied voltage to the power terminal 51-1, compares the output voltage of the power supply circuit 36 to the voltage of the power terminal 51-1, and compares a predetermined standard voltage to the voltage of the power terminal 51-1. The predetermined standard voltage referred to by the comparator 58-1 is a voltage necessary to drive the drive circuit 53-1 and generated from the battery voltage VDD by the comparator 58-1.

Output of the comparator 58-1 is supplied to the control unit 54-1. Thereby, the power supply circuit 36 is controlled to be on/off, and the switches 55-1 and 57-1 are also controlled to be on/off. In an initial state, the power supply circuit 36 and the switches 55-1 and 57-1 are off.

The interface unit 46 corresponding to the interface 21 of the second device 15 is configured in the same manner as the interface unit 45 of the first device 14. In FIG. 2, the elements of the second device 15 which are the same as those of the first device 14 are provided with the same reference signs but have a hyphen and a number 2 thereafter.

In the first device 14 shown in FIG. 2, in addition, the power supply circuit 36 for the interface is referred to as "Reg1", the power terminal 51-1 as "Terminal 1-1", the data terminal 52-1 as "Terminal 2-1", the drive circuit 53-1 as "Drive circuit 1", the control unit 54-1 as "Control unit 1", the switch 55-1 as "SW1-1", the reverse current preventing circuit 56-1 as "Reverse current blocking 1", and the switch 57-1 as "SW2-1", which are expressed in corresponding blocks.

Likewise, in the second device 15, the power supply circuit 38 for the interface is referred to as "Reg2", the power terminal 51-2 as "Terminal 1-2", the data terminal 52-2 as "Terminal 2-2", the drive circuit 53-2 as "Drive circuit 2", the control unit 54-2 as "Control unit 2", the switch 55-2 as "SW1-2", the reverse current preventing circuit 56-2 as "Reverse current blocking 2", and the switch 57-2 as "SW2-2", which are expressed in corresponding blocks.

Figure 3:
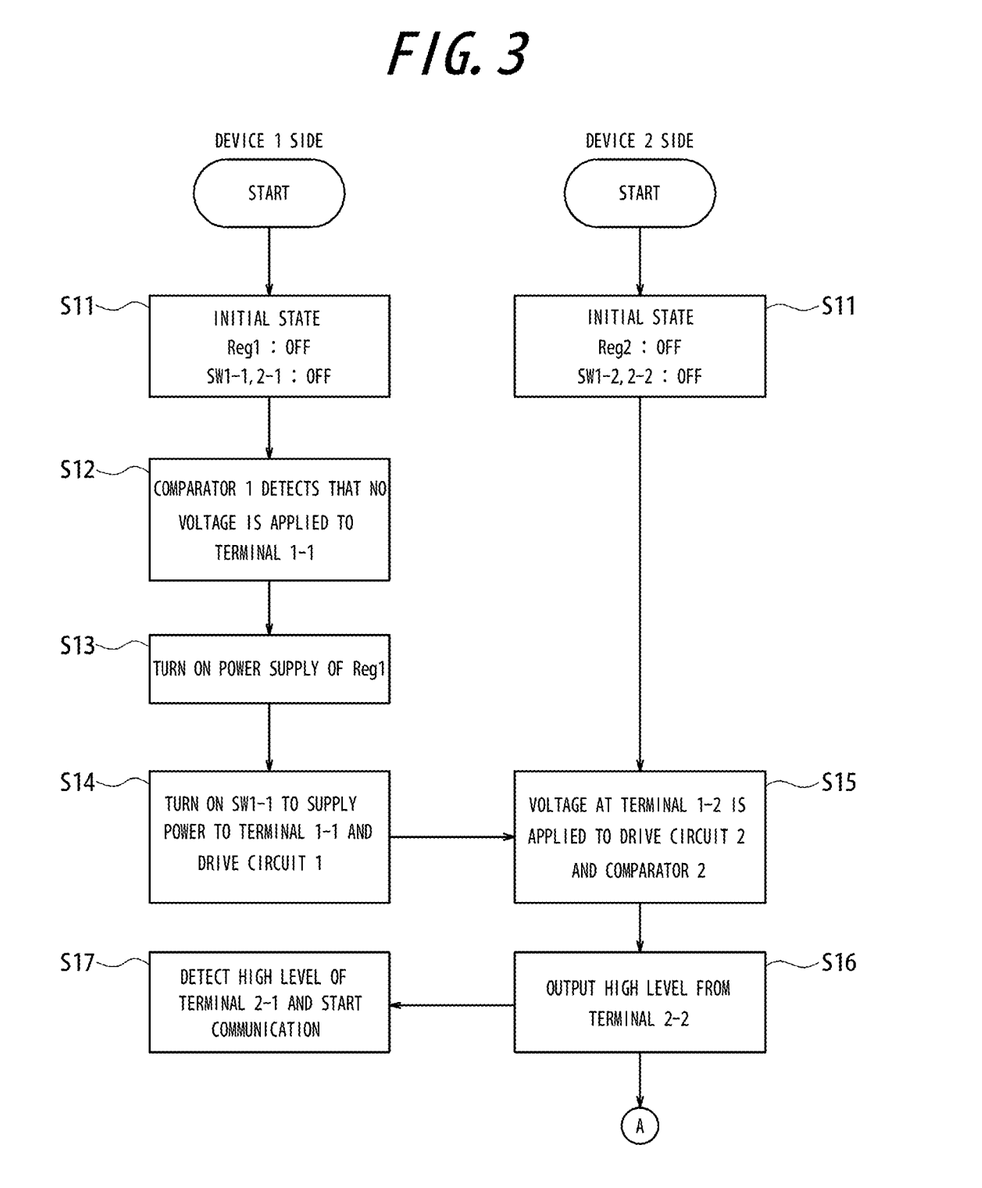
FIG. 3 is a flow chart illustrating an operation of a main section of the device incorporating the data communication function according to the first embodiment.
Figure 4:
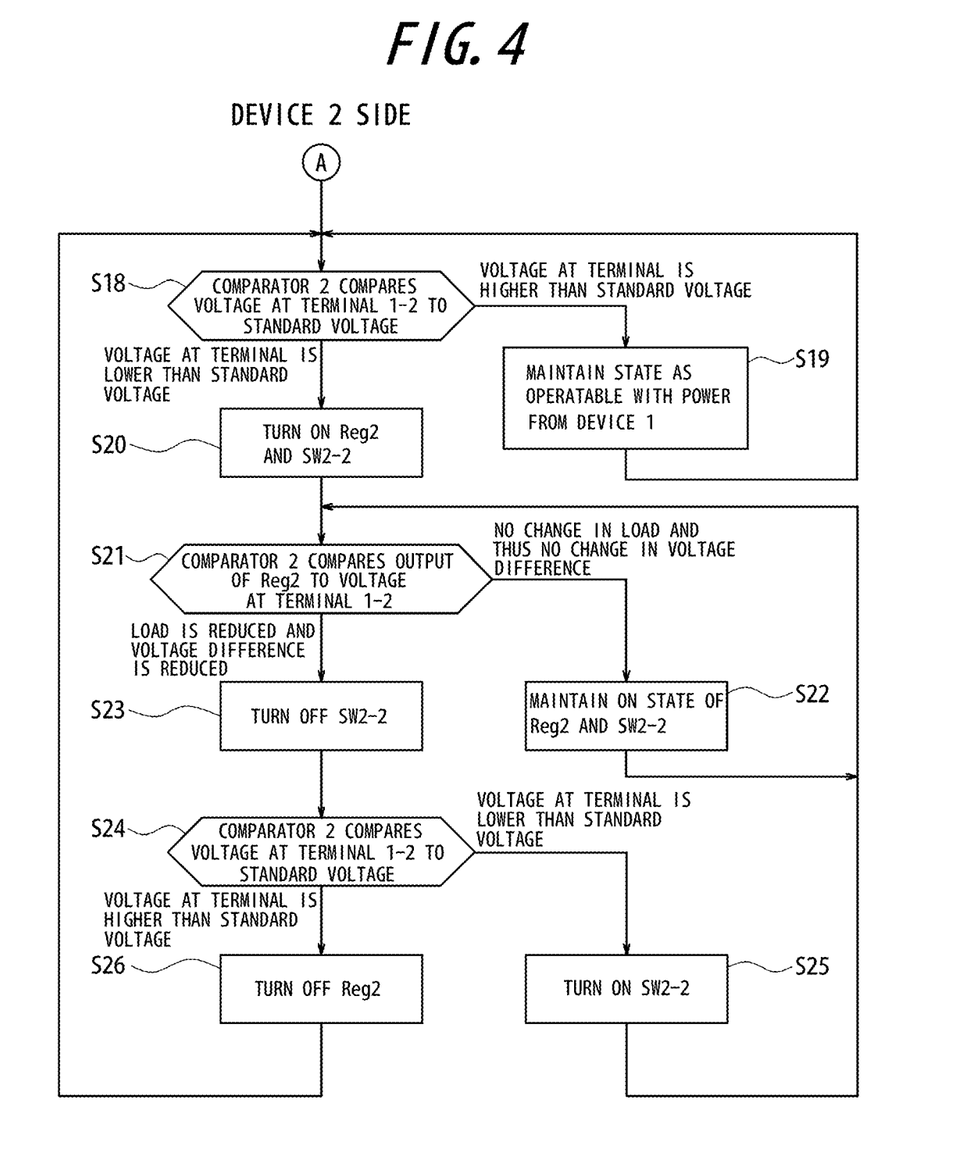
FIG. 4 is a flow chart illustrating the operation of the main section of the device incorporating the data communication function according to the first embodiment.

The following is a description of an operation of data communication by the device incorporating the data communication function according to the present embodiment shown in FIG. 2, by using an exemplified case where the data communication is initiated by the first device 14 to the second device 15, with reference to the flow charts in FIG. 3 and FIG. 4. It is to be noted that terms expressed in the blocks in FIG. 2 are used in the following description.

Until communication is initiated, the device 1 maintains an initial state in which all of the Reg1, SW1-1 and SW2-1 are off. Likewise, the device 2 maintains the initial state in which all of the Reg2, SW1-2 and SW2-2 are off (step S11). In order for the device 1 to initiate a communication to the device 2 in the initial state, the control unit 1 first checks whether voltage is applied to the terminal 1-1 from the output of the comparator 1 (step S12). If the voltage is applied to the terminal 1-1, the Reg1 is controlled to be on/off by the control unit 1. In this case, since the Reg1 is off in the initial state, power is supplied from an external device (device 2 in FIG. 2). Here, it is assumed that voltage is not applied to the terminal 1-1.

When it is confirmed that voltage is not applied to the terminal 1-1 at step S12, power supply of the Reg1 is turned on (step S13) and then the SW1-1 is turned on as well, thereby supplying power from the Reg1 to the terminal 1-1 via the SW1-1 and also supplying power to the Drive circuit 1 so as to drive the Drive circuit 1 (step S14).

On the other hand, when power is supplied from the terminal 1-1 of the device 1 to the terminal 1-2 of the device 2 via the interface 21, the voltage applied to the terminal 1-2 is input to the comparator 2 and the power supplied to the terminal 1-2 is supplied to the Drive circuit 2 so as to drive the Drive circuit 2 (step S15), and thereby a high-level signal is output from the terminal 2-2 to the interface 21 (step S16).

The device 1 detects the high level signal from the device 2 with the Drive circuit 1 via the terminal 2-1, and starts the data communication with the device 2 (step S17).

In this state, accordingly, since the Reg2 of the device 2 is off and the data communication is performed between the device 1 and the device 2 via the interface 21 by using power of the Reg1 of the device 1, it reduces power consumption.

In an actual configuration of the apparatus, however, there may be a case where the power only from Reg1 is not sufficient during the data communication. The device incorporating the data communication function according to the present embodiment enables the data communication even in such a case. In the device 2, the voltage at the terminal 1-2 and the standard voltage generated from the battery voltage VDD are compared by the comparator 2, so as to monitor the voltage applied to the terminal 1-2 (step S18).

If the voltage at the terminal 1-2 is equal to or higher than the standard voltage as a result, the control unit 2 determines that power from the device 1 is sufficient to operate (step S19) and returns to step S18 to maintain the monitoring state of the voltage.

In contrast, if the voltage at the terminal 1-2 is lower than the standard voltage, the control unit 2 turns the Reg2 and the SW2-2 on so as to supply power from the Reg2 to the Drive circuit 2 via the reverse current blocking 2 and the SW2-2, thereby ensures normal data communication (step S20).

In such a state, however, both of the Reg1 and the Reg2 are turned on and thus increasing power consumption. Therefore, the device incorporating the data communication function according to the present embodiment turns the Reg2 off wherever possible. For this reason, the device 2 monitors the load of the terminal 1-2 by comparing the output voltage of the Reg2 and the voltage at the terminal 1-2 by the comparator 2 (step S21).

As a result, if there is no change in a difference between the output voltage of the Reg2 and the voltage at the terminal 1-2 after the Reg2 is turned on, that is, if there is no change in load or if the difference in the voltages is increased, namely, the load is increased, the control unit 2 determines to maintain the on state of the Reg2 and the SW2-2 (step S22) and returns to step S21 to maintain the monitoring state of the load.

In contrast, if the difference between the output voltage of the Reg2 and the voltage at the terminal 1-2 is decreased, that is, if the load is reduced, the control unit 2 turns the SW2-2 off (step S23) and controls the comparator 2 to compare the voltage at the terminal 1-2 and the standard voltage (step S24).

As a result, if the voltage at the terminal 1-2 is lower than the standard voltage, which means that the voltage is still not sufficient, thus the control unit 2 turns the SW2-2 on (step S25) again and returns to step S24 to monitor the load of the terminal 1-2.

In contrast, if the voltage at the terminal 1-2 is equal to or higher than the standard voltage, which means that sufficient power is supplied by the Reg1, thus the control unit 2 turns the Reg2 off (step S26) and shifts to a process at step S18.

As described above, since the device incorporating the data communication function according to the present embodiment turns off the Reg2 of itself and drives the Drive circuit 2 to perform a communication by using power supplied to the terminal 1-2 from the Reg1 of the device 1, which initiates the communication, and also maintains the Reg2 off while the voltage applied to the terminal 1-2 is equal to or higher than the standard voltage, it is thus possible to reduce self-power-loss. Moreover, if the comparator 2 detects that the voltage applied to the terminal 1-2 is lower than the standard voltage, the device incorporating the data communication function according to the present embodiment turns the Reg2 and the SW2-2 on so as to drive the Drive circuit 2 by using power from the Reg1 and power from the Reg2 of itself, which is supplied via the reverse current blocking 2 and the SW2-2. It is thus possible to perform highly reliable communication in a stable manner.

Second Embodiment

Figure 5:
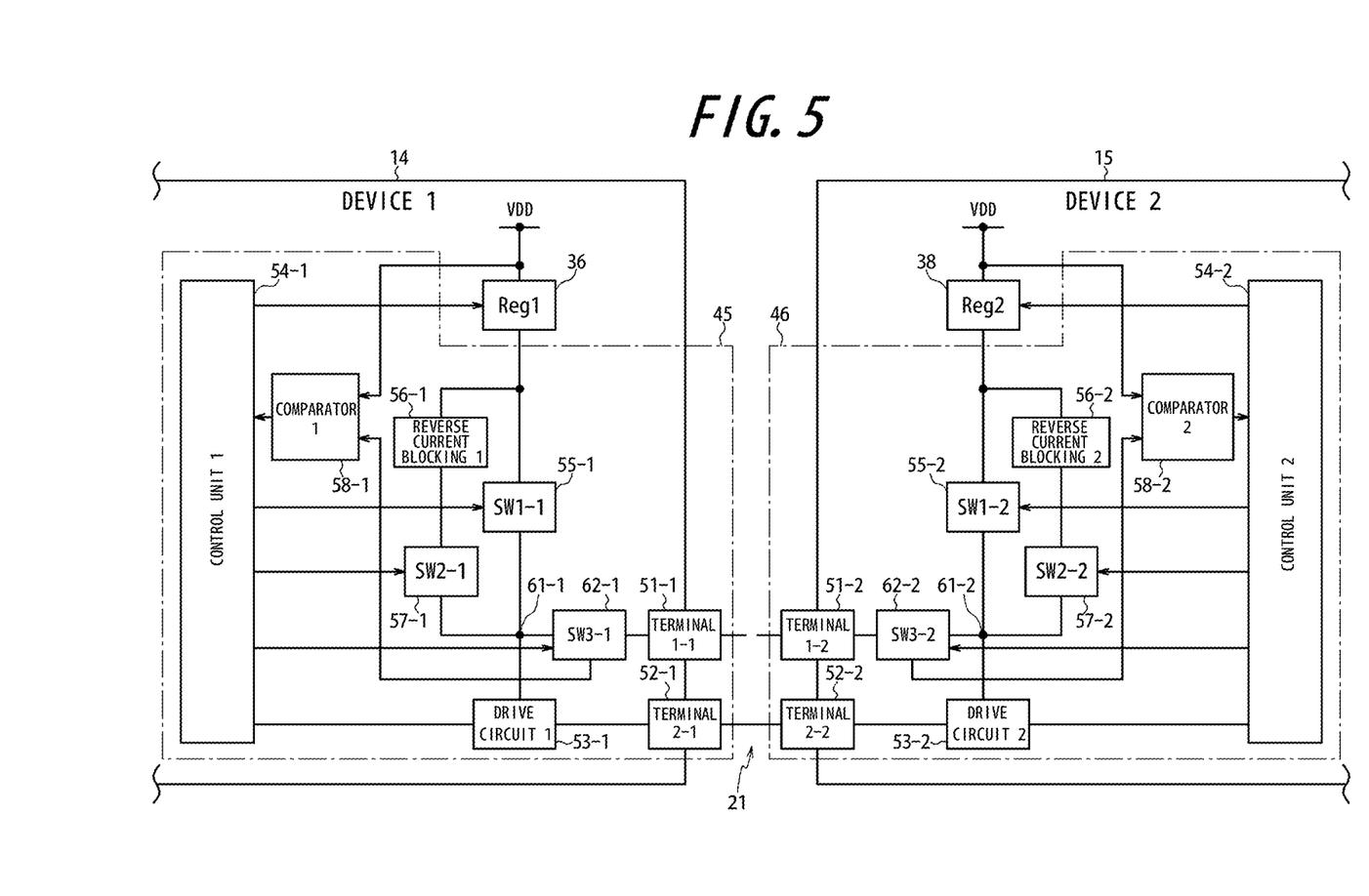
FIG. 5 is a block diagram illustrating a configuration of a main section of an interface unit of a device incorporating a data communication function according to a second embodiment of the present invention.

FIG. 5 is a block diagram illustrating a configuration of a main section of an interface unit of the device incorporating the data communication function according to a second embodiment of the present invention. According to the device incorporating the data communication function of the present embodiment, if the Reg2 of the device 2 of the reception side is turned on after the Reg1 of the device 1 which initiates the data communication is turned on in the first embodiment, the Reg1 of the device 1 may be turned off under a predetermined condition.

Therefore, the device incorporating the data communication function according to the present embodiment further includes, in the configuration shown in FIG. 2, a switch (SW3-1) 62-1 between a connection point 61-1 of the switch 55-1, the switch 57-1 and the drive circuit 53-1 and the power terminal 51-1 in the interface unit 45 of the first device 14. In addition, a comparator 58-1 monitors voltage applied to the power terminal 51-1, as well as comparing the voltage and the standard voltage generated from the battery voltage VDD to provide a result of the comparison to the control unit 54-1. Thereby, the control unit 54-1 controls the power supply circuit 36 to be turned on/off, as well as controlling the switches 55-1, 57-1 and 62-1 to be turned on/off. In an initial state, the power supply circuit 36 and the switches 55-1, 57-1 and 62-1 are off. Other constitutions are the same as those of the device 1 shown in FIG. 2.

An interface unit 46 corresponding to the interface unit 21 of the second device 15 is configured in the same manner as the interface unit of the first device 14. In FIG. 5, the same elements as those in the first device 14 are provided with the same reference signs but have a hyphen and a number 2 thereafter.

Figure 6:
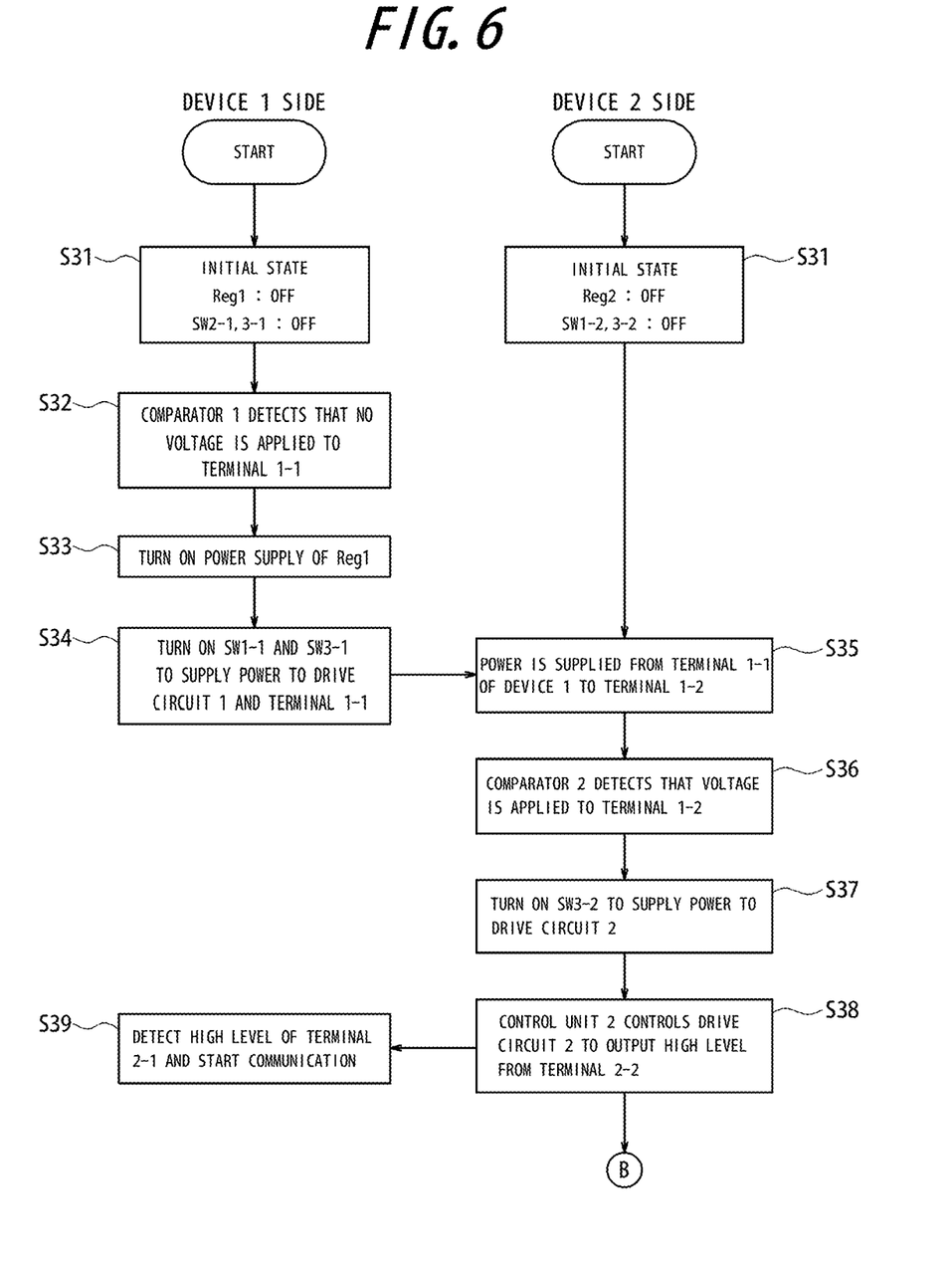
FIG. 6 is a flow chart illustrating an operation of a main section of the device incorporating the data communication function according to the second embodiment.
Figure 7:
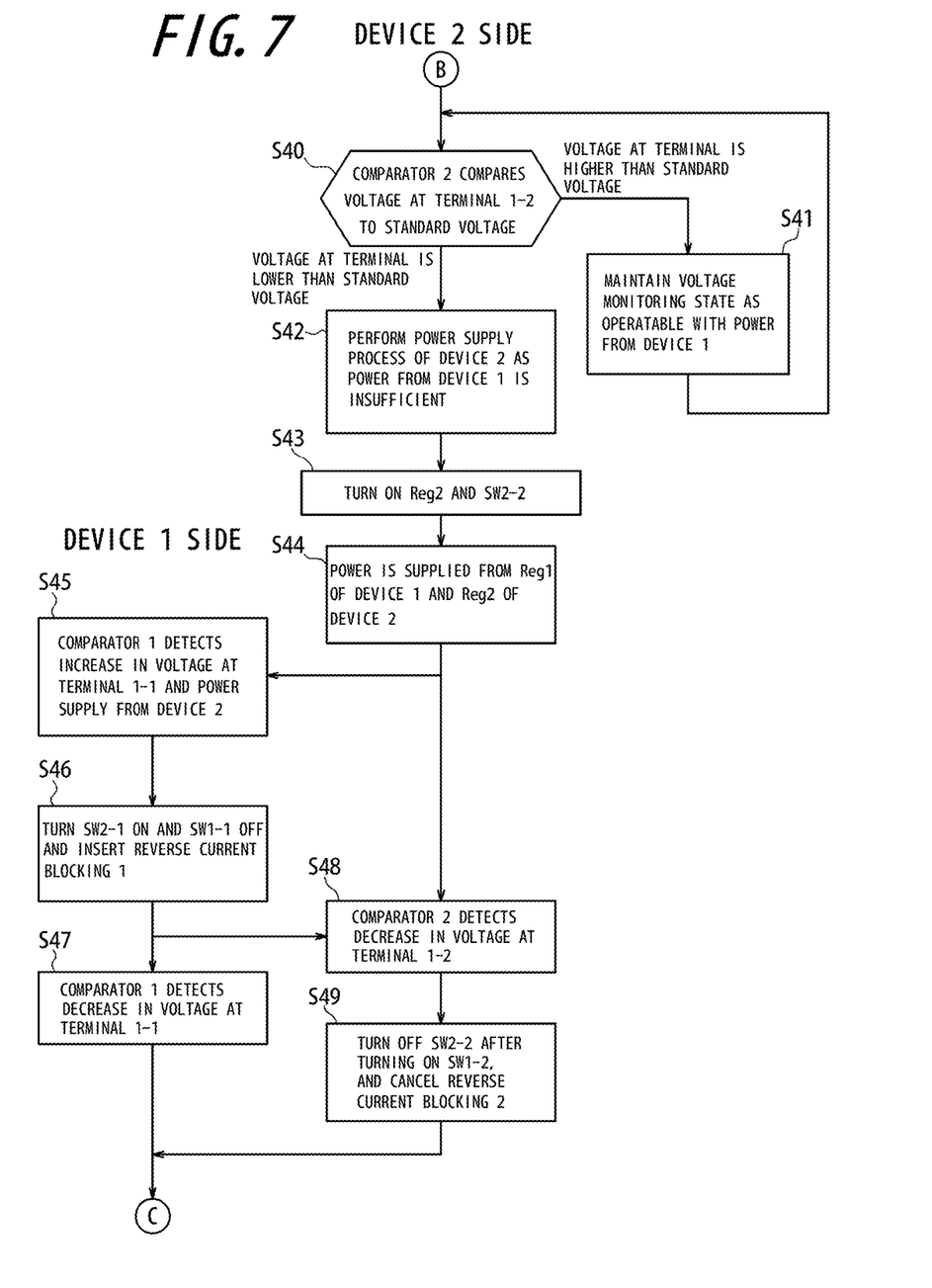
FIG. 7 is a flow chart illustrating the operation of the main section of the device incorporating the data communication function according to the second embodiment.
Figure 8:
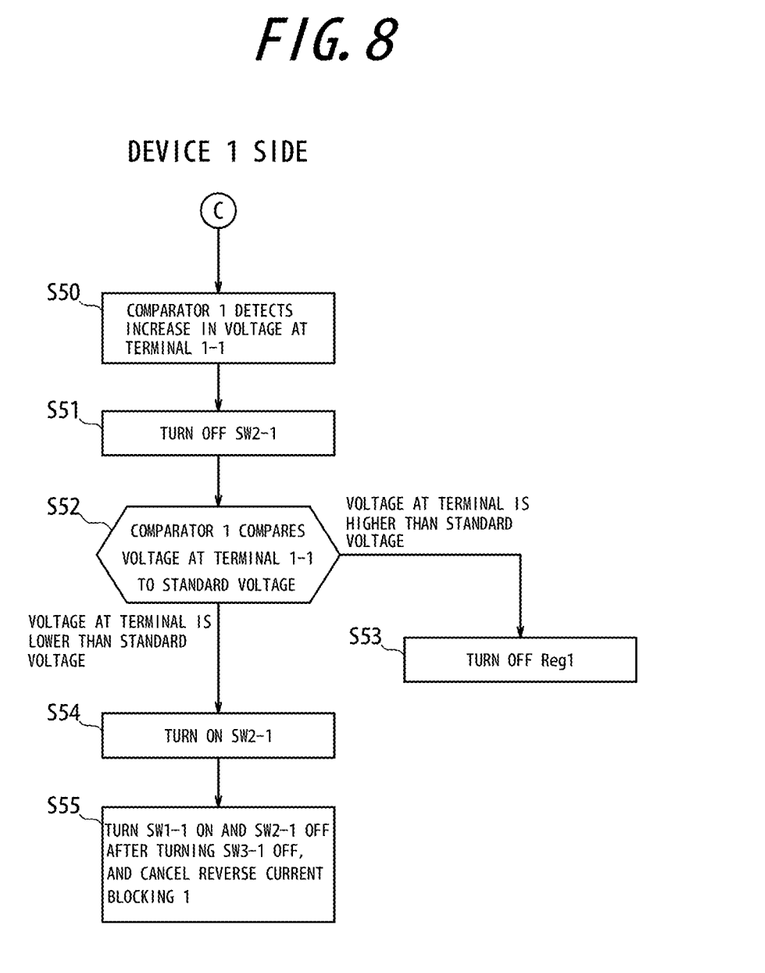
FIG. 8 is a flow chart illustrating the operation of the main section of the device incorporating the data communication function according to the second embodiment.

The following is a description of an operation of data communication by the device incorporating the data communication function according to the present embodiment shown in FIG. 5, by using an exemplified case where the data communication is initiated by the first device 14 to the second device 15, with reference to the flow charts in FIG. 6 to FIG. 8. It is to be noted that terms expressed in blocks in FIG. 5 are used in the following description.

Until communication is initiated, the device 1 maintains the initial state in which all of the Reg1, the SW1-1, the SW2-1 and the SW3-1 are off. Likewise, the device 2 maintains the initial state in which all of the Reg2, the SW1-2, the SW2-2 and the SW3-2 are off (step S31). In order for the device 1 to initiate communication with the device 2 in the initial state, the control unit 1 first checks whether voltage is applied to the terminal 1-1 from the output of the comparator 1 (step S32). Here, it is assumed that the voltage is not applied to the terminal 1-1.

When it is confirmed that voltage is not applied to the terminal 1-1 at step S32, the control unit 1 turns the power supply of the Reg1 on (step S33) and also turns SW1-1 and SW3-1 on, thereby supplying power from the Reg1 to the terminal 1-1 via the SW1-1 and the SW3-1 and also supplying power to the Drive circuit 1 via the SW1-1 so as to drive the Drive circuit 1 (step S34).

When the Reg1, the SW1-1 and the SW3-1 are turned on, the terminal 1-2 of the device 2 is supplied with power from the terminal 1-1 of the Reg1 via the interface 21 (step S35).

In the device 2, when the comparator 2 detects that voltage is applied to the terminal 1-2 (step S36), the control unit 2 turns the SW3-2 on so as to drive the Drive circuit 2 by providing the Drive circuit 2 with the power supplied to the terminal 1-2 (step S37) and also controls the Drive circuit 2 such that a high level signal is output from the terminal 2-2 to the interface 21 (step S38).

The device 1 detects the high level signal from the device 2 with the Drive circuit 1 via the terminal 2-1, and starts the data communication with the device 2 by detecting.

Accordingly, in this state the Reg2 of the device 2 is turned off and the data communication is performed between the device 1 and the device 2 via the interface 21 by using power of the Reg1 of the device 1, thereby reducing power consumption.

In the same manner as the first embodiment, the present embodiment considers a case where the Reg1 cannot supply sufficient power during the data communication and enables the data communication even in such a case. In the device 2, the voltage at the terminal 1-2 and the standard voltage generated from the battery voltage VDD are compared by the comparator 2, so as to monitor the voltage applied to the terminal 1-2 (step S40).

If the voltage at the terminal 1-2 is equal to or higher than the standard voltage as a result, the control unit 2 determines that power from the device 1 is sufficient to operate (step S41) and returns to step S40 to maintain the monitoring state of the voltage.

In contrast, if the voltage at the terminal 1-2 is lower than the standard voltage, the control unit 2 determines that the power from the device 1 is insufficient and performs a power supply process of the device 2 (step S42). Therefore, the Reg2 and the SW2-2 are turned on (step S43) and thereby the Drive circuit 2 is supplied with not only power from the device 1 but also power from the Reg2 via the reverse current blocking 2 and the SW2-2, so as to ensure the normal data communication (step S44).

In such a state, however, both of the Reg1 and the Reg2 are turned on and thus increasing power consumption. Therefore, the device incorporating the data communication function according to the present embodiment turns off the Reg1 whenever possible.

In the device 1, therefore, the control unit 1 detects increase in the voltage at the terminal 1-1 to be higher than the standard voltage from the output of the comparator 1 (step S45), turns the SW2-1 on and then turns the SW1-1 off so as to insert the reverse current blocking 1 to a power supply path (step S46). That is, since the voltage applied to the terminal 1-1 of the device 1 becomes higher when the Reg2 of the device 2 is turned on, it is detected that the Reg2 is turned on by detecting a change in the voltage by the comparator 1.

When the reverse current blocking 1 is inserted at step S46, the voltage at the terminal 1-1 detected by the comparator 1 is decreased as much as power loss by the reverse current blocking 1 (step S47). Likewise, the voltage at the terminal 1-2 detected by the comparator 2 is also decreased in the device 2 (step S48).

Therefore, when the comparator 2 detects that the voltage at the terminal 1-2 is reduced in the device 2, the control unit 2 turns the SW1-2 on and then turns the SW2-2 off so as to cancel the reverse current blocking 2. The power from Reg2 is thereby supplied to the Drive circuit 2 and the terminal 1-2 without the reverse current blocking 2 (step S49).

When the reverse current blocking 2 in the device 2 is cancelled as stated above, power of Reg2 is not lost by the reverse current blocking 2, and thus the voltage at the terminal 1-2 increases and also the voltage applied to the terminal 1-1 of the device 1 increases to be equal to or higher than the standard voltage.

When increase in the voltage at the terminal 1-1 of the device 1 is detected by the comparator 1 (step S50), the control unit 1 turns the SW2-1 off (step S51) and compares the voltage at the terminal 1-1 and the standard voltage by the comparator 1 (step S52), so as to check whether it is possible to drive only with the Reg2 of the device 2.

If the voltage at the terminal 1-1 is equal to or higher than the standard voltage as a result, the control unit 1 turns the Reg1 Off (step S53). In this case, accordingly, the data communication is performed between the device 1 and the device 2 via the interface 21 by the power of Reg2 of the device 2, and it is thus possible to reduce power consumption.

In contrast, if the voltage at the terminal 1-1 is lower than the standard voltage, the control unit 1 turns the SW2-1 on again (step S54). Since both of the Reg1 of the device 1 and the Reg2 of the device 2 are on in this state, it is preferred to eliminate power loss by the reverse current blocking 1 and the reverse current blocking 2 and to supply power to the Drive circuit 1 and the Drive circuit 2 individually.

In this case, therefore, the control unit 1 of the device 1 turns the SW3-1 off, and then turns the SW1-1 on and the SW2-1 off so as to cancel the reverse current blocking 1 (step S55). In this state, the reverse current blocking 2 of the device 2 has been already cancelled at step S49.

As stated above, with regard to the device incorporating the data communication function according to the present embodiment, the device 2 of a reception side of the data communication turns the Reg2 of itself off in the same manner as the first embodiment and performs the communication by driving the Drive circuit 2 by using power supplied to the terminal 1-2 from Reg1 of the device 1 which initiates the communication and, if the voltage applied to the terminal 1-2 is equal to or higher than the standard voltage, maintains the Reg2 off. It is thus possible to reduce self-power-loss.

In addition, if the Reg2 of the device 2 is turned on and the voltage applied to the terminal 1-1 is equal to or higher than the standard voltage after Reg1 of the device 1 as the initiator of the data communication is turned on to start the data communication, the reverse current blocking 1 is inserted. And then, if the voltage applied to the terminal 1-1 is higher than the standard voltage in a state where the power supply from the Reg1 is blocked, the Reg1 is turned off and Drive circuit 1 is driven by the Reg2 to perform the communication. Therefore, it is possible to reduce self-power-loss of the device 1.

As described in the above embodiments, since each of the device incorporating the data communication function according to the present invention has power supply circuit, even if power supply is insufficient when a system is constituted by connecting a plurality of devices via the same interface such as a bus connection or a daisy chain, for example, it is possible to address by turning on the power supply circuits of the plurality of devices, and thus there is no need to redesign the power supply circuit, unlike the multiple power supply device. Thus, since there is no restriction by the power supply circuit, it is possible to easily achieve expansion of functions for the mobile terminal and the likes. That is, expansion of functions can be achieved without changing an operating time by changing a battery capacity for supplying power to the entire system in accordance with expanded configuration.

Figure 9:
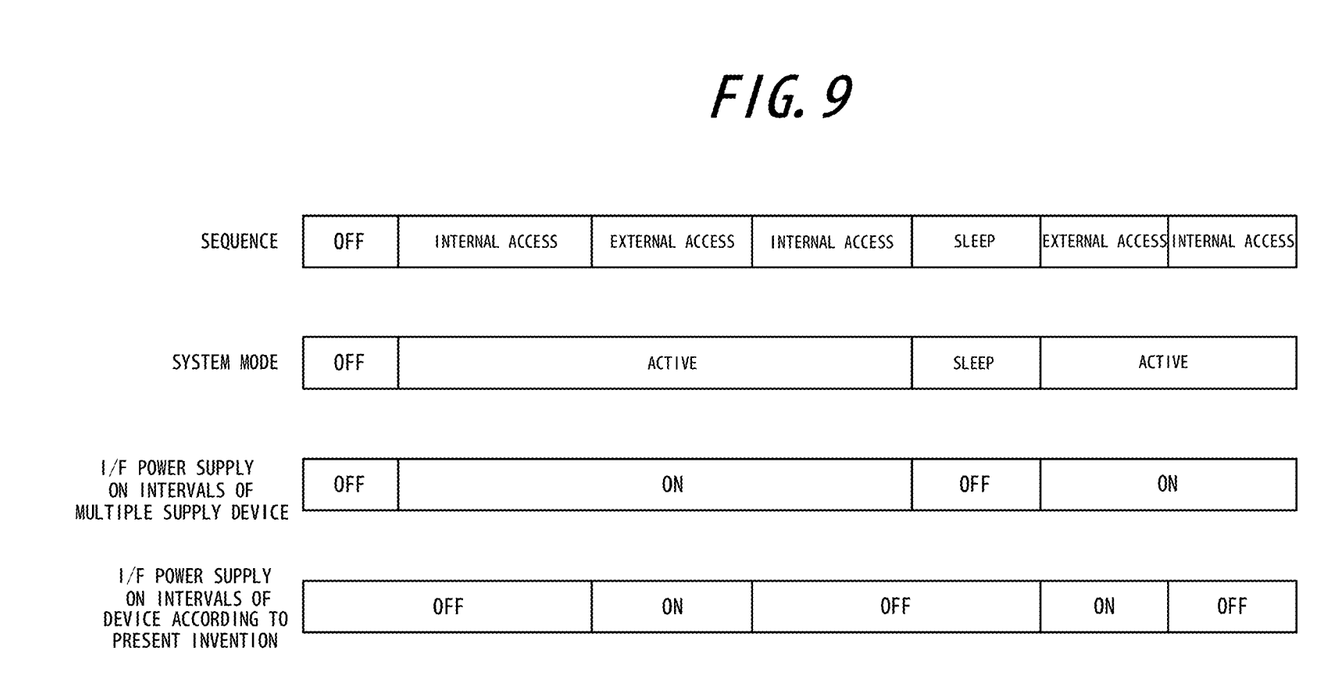
FIG. 9 is a diagram comparatively illustrating operations of an I/F power supply circuit in a system using a conventional multiple power supply device and in a system using the device incorporating the data communication function according to the present invention.

Moreover, when the system is constituted by using the multiple power supply device as shown in FIG. 9, a power supply of the interface (I/F) is turned on/off according to a state transition of the system such as a sleep mode or a suspend mode. However, if the system is constituted by using the device incorporating the data communication function according to the present invention, it enables to turn on/off a corresponding power supply circuit only when respective interface I/F exchanges signals. Accordingly, since it is possible to reduce power consumption of the power supply circuit in a normal operation state as well, power consumption can be reduced much more than the system constituted by using the multiple power supply device. In addition, since power consumption by each power supply circuit is thereby reduced, it is possible to reduce the area of the power supply circuit of the hybrid IC and achieve downsizing of the device.

It is to be understood that the present invention is not limited to the embodiment set forth above but may be varied or altered in a multiple of manners. For example, the device incorporating the data communication function according to the present invention is not only applicable to the mobile terminal used in the above embodiments but also may be used as a component of a variety of electronic devices. In addition, since the device itself has a power supply circuit capable of being turned on/off, the device incorporating the data communication function according to the present invention can be mounted in a system using the conventional multiple power supply device and can be incorporated when shifting the conventional multiple power supply system to the dispersed power supply system.

The invention claimed is:
1. A mobile terminal comprising:
a battery; and
a plurality of devices that are interconnected via an interface, wherein each of the plurality of devices comprises a power supply circuit connected to the battery, a terminal for receiving power supply from another one of the plurality of devices that initiates data communication with the device via the interface, and a drive circuit for performing data communication with the another device, wherein, if power is supplied to the terminal, the power supplied to the terminal is supplied to the drive circuit in an off state of the power supply circuit.

2. The mobile terminal according to claim 1, wherein each of the plurality of devices further comprises:

a comparator for comparing voltage applied to the terminal and a standard voltage; and a reverse current preventing circuit for preventing reverse current from flowing to the power supply circuit, wherein if the comparator detects that the voltage applied to the terminal is lower than the standard voltage, the power supply circuit is turned on such that power is supplied to the drive circuit from the power supply circuit via the reverse current preventing circuit, and wherein if the comparator detects that the voltage applied to the terminal is equal or higher than the standard voltage while the power is supplied to the terminal, the power supply circuit is turned off such that the power being supplied to the terminal is supplied to the drive circuit.

3. The mobile terminal according to claim 1, wherein each of the plurality of devices further comprises:

a comparator for comparing voltage applied to the terminal and a standard voltage; and a reverse current preventing circuit for preventing reverse current from flowing to the power supply circuit, wherein if the comparator detects that the voltage applied to the terminal is lower than the standard voltage, the power supply circuit is turned on such that power is supplied to the drive circuit from the power supply circuit via the reverse current preventing circuit, and wherein if the comparator detects that the voltage applied to the terminal is reduced while the power is supplied to the terminal, power is supplied to the drive circuit from the power supply circuit without the reverse current preventing circuit.

4. A device incorporating a data communication function and having a power supply circuit of a dispersed power supply system, comprising:

a drive circuit for performing data communication with another device;

a terminal for supplying power to the another device or for receiving power supply from the another device;

a comparator for comparing voltage applied to the terminal and a standard voltage; and a reverse current preventing circuit for preventing reverse current from flowing to the power supply circuit, wherein in order to initiate data communication the power supply circuit is turned on and power is supplied from the power supply circuit to the drive circuit as well as to the terminal, and wherein if the comparator detects that the voltage applied to the terminal is equal to or higher than the standard voltage while the power is supplied to the terminal, power is supplied to the drive circuit and the terminal from the power supply circuit via the reverse current preventing circuit, and then, if the comparator detects that the voltage applied to the terminal is equal to or higher than the standard voltage in a state where power supply from the power supply circuit is blocked, the power supply circuit is turned off and the power supplied to the terminal is supplied to the drive circuit.

* * * * *